L. S. PFOUTS.
PASTEURIZING APPARATUS.
APPLICATION FILED JAN. 9, 1913.
1,076,604.
Patented Oct. 21, 1913.
3 SHEETS—SHEET 1.
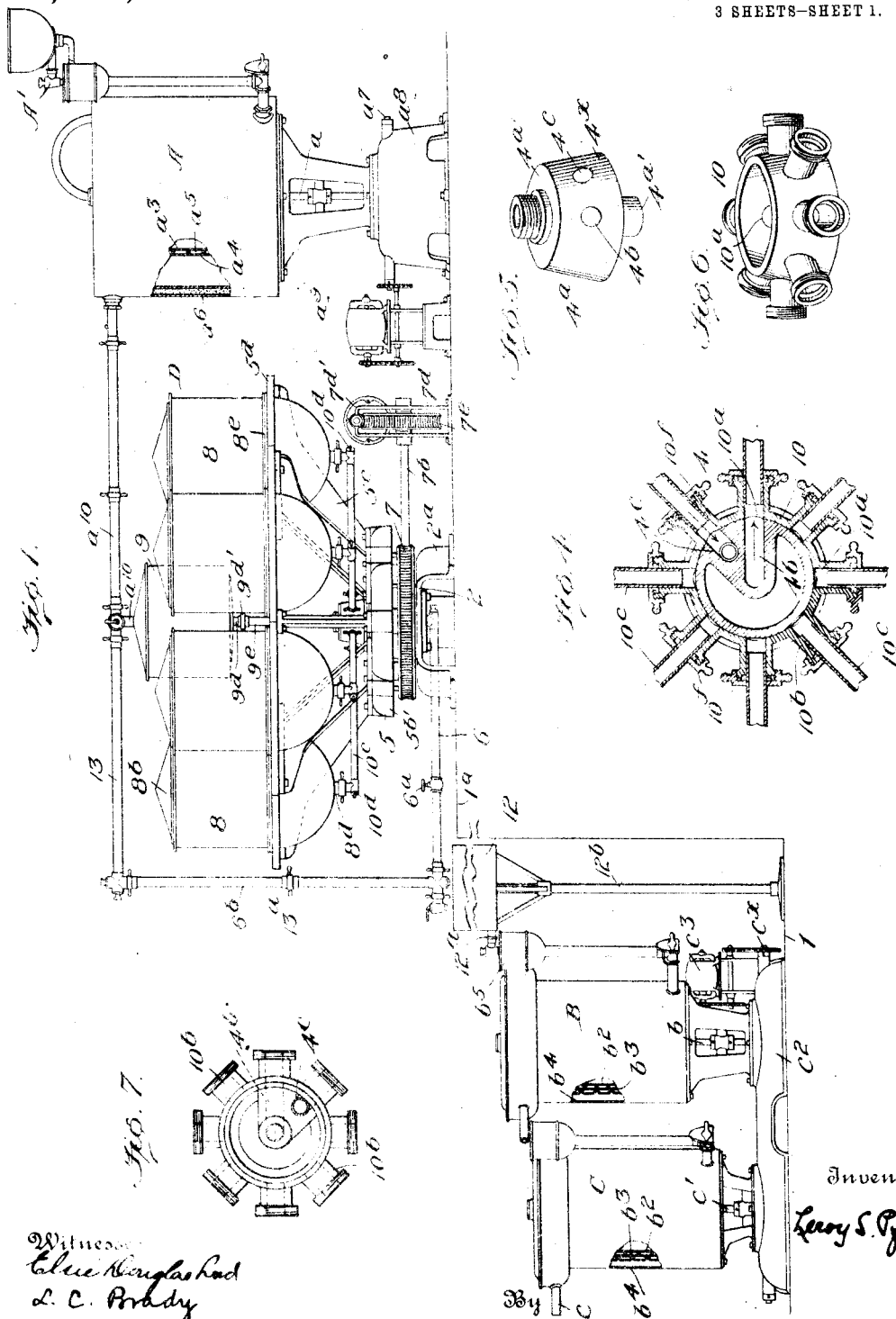

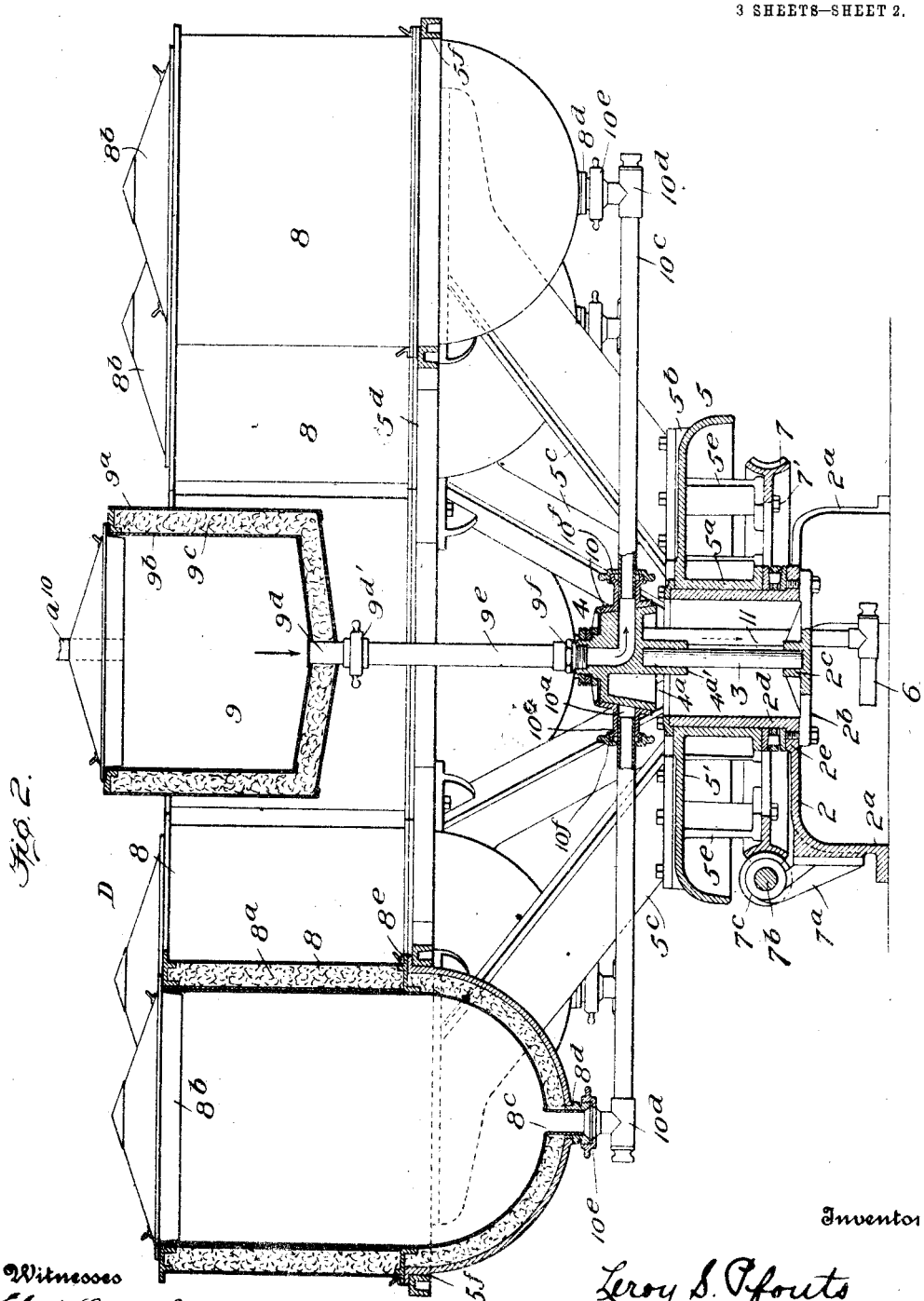

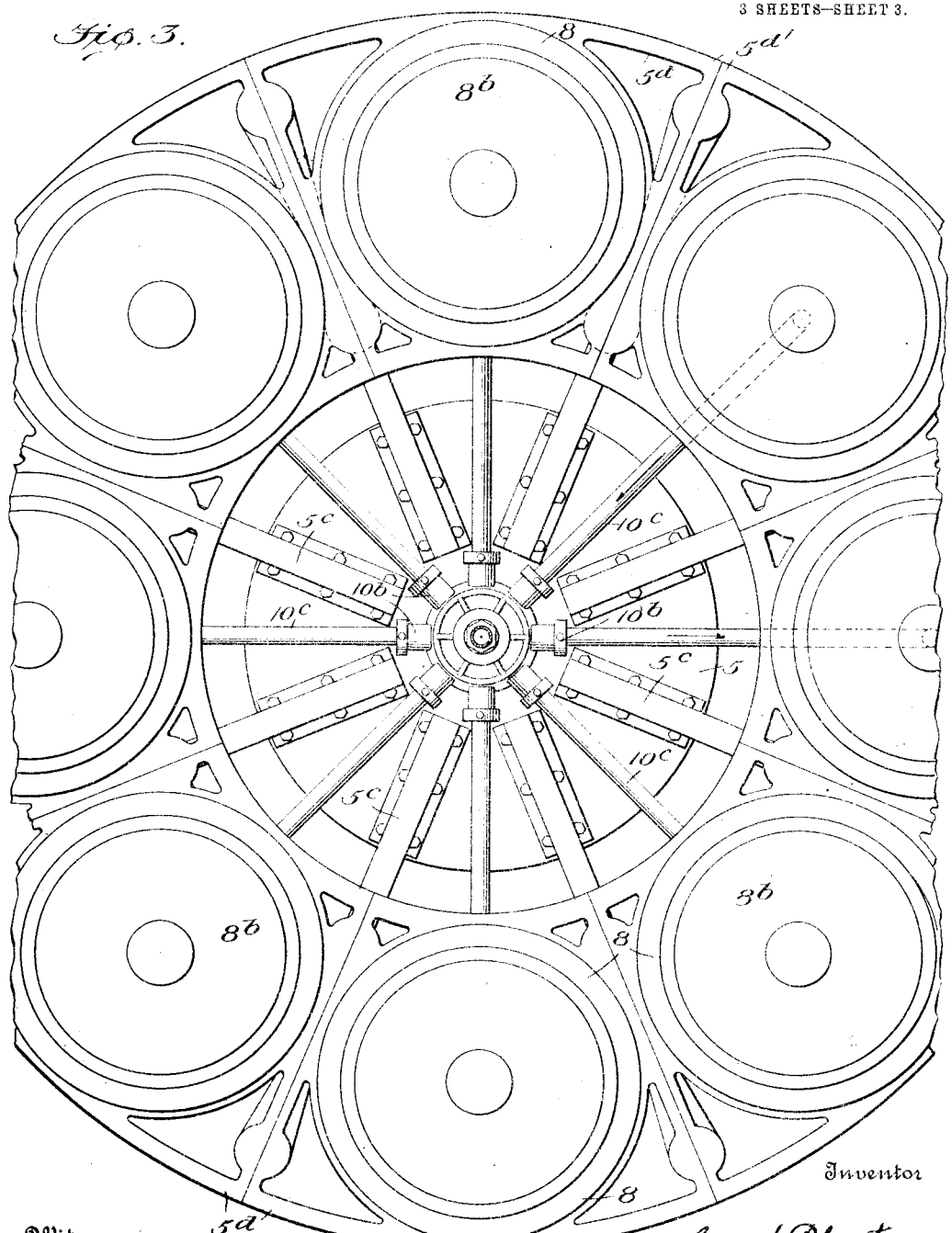

UNITED STATES PATENT OFFICE.

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

PASTEURIZING APPARATUS.

1,076,604.  Specification of Letters Patent.  Patented Oct. 21, 1913.

Application filed January 9, 1913. Serial No. 740,940.

*To all whom it may concern:*

Be it known that I, LEROY S. PFOUTS, a citizen of the United States, residing at Canton, in the county of Stark and State of Ohio, have invented certain new and useful Improvements in and Relating to Pasteurizing Apparatus, of which the following is a specification.

This invention relates to pasteurizing apparatus, and particularly to apparatus adapted to treat liquid, such as milk.

I have illustrated my invention in connection with a liquid treating apparatus such as shown and described in my application filed January 25, 1909, Serial No. 474,128. It will be understood, however, that my improvements in liquid distributing and holding mechanism for pasteurizing apparatus may be used in connection with a liquid treating apparatus of any suitable or preferred construction and while the embodiment of the invention illustrated herein has been conformed to coöperate with the general construction of apparatus shown in my said application, it may be adapted to suit any particular construction of apparatus in connection with which it may be used.

Referring to the drawings, which show one embodiment of the invention: Figure 1 is a side elevation of my apparatus operatively connected with the liquid treating apparatus described in my aforesaid application. Fig. 2 is a side elevation, partly in section, of the liquid distributing and holding mechanism. Fig. 3 is a top plan view of the apparatus shown in Fig. 2. Fig. 4 is a horizontal section through the valve mechanism. Fig. 5 is a perspective view of one of the valve members. Fig. 6 is a perspective view of the other valve member. Fig. 7 is a bottom plan view of the valve mechanism.

In the drawings, A indicates a heater for the liquid, B a preliminary cooler, and C a final cooler, each of which is shown merely for the purpose of illustration.

D indicates as a whole a liquid distributing and holding apparatus, preferably interposed between the heater A and preliminary cooler B. The heater A, holding apparatus D, and coolers B, C, are preferably arranged in stepped relationship to each other in order that the liquid may flow by gravity from one to the other and finally be discharged by the discharge pipe, indicated at $e$, carried by the final cooler C, into any suitable receptacle. Preferably the floor 1 for the apparatus D is elevated, as shown at $1^a$, to provide for the proper flow of the liquid therefrom to the preliminary cooler B.

The heater A comprises an inner rotary vessel $a^3$ connected with a driven shaft $a$ and adapted to hold a heating medium; an intermediate vessel $a^4$ surrounding the vessel $a^3$; and forming therewith a liquid film space $a^5$, and an outer vessel $a^6$, surrounding the inner and intermediate vessels $a^3$, $a^4$ and adapted to form with the outer walls of the latter vessel a chamber to receive a suitable heating medium. The shaft $a$ is geared to a driving shaft $a^7$, which is mounted in bearings in a pedestal $a^8$. The shaft $a^7$ may be driven by a suitable motor, such as indicated at $a^9$.

Each of the coolers B and C comprises an inner rotary vessel $b^2$, connected with driven shafts $b$, $c'$, respectively; an intermediate vessel $b^3$, and an outer vessel $b^4$. These vessels are constructed and arranged relatively to each other to form a liquid film space, and a space or chamber on opposite sides of the film space for a suitable cooling medium. The shafts $b$, $c'$, are connected to and driven by a driving shaft $c^x$, which is mounted in bearings provided therefor in the base, indicated at $c^2$, on which the preliminary and final coolers, B, C, are mounted. The shaft $c^x$ may be driven from any suitable source of power, such as a motor $c^3$.

The heater A, and coolers B and C, are constructed, generally, and operate similarly to corresponding parts shown and described in the patent issued to John C. Miller on the 4th day of February, 1908, and numbered 878,225; and as the particular construction of each thereof forms no part of the present invention, further description of these parts will be omitted, as they are fully shown and described in the aforesaid patent, to which reference may be made.

Of the distributing and holding apparatus D, 2 indicates a base of any suitable construction, but preferably formed from metal and having feet $2^a$.

$2^b$ indicates a support, preferably bolted to the underside of the base 2 and provided with an axially arranged end thrust bearing or socket $2^c$ for the lower end of a vertical supporting rod 3. The rod 3 extends upwardly a suitable distance and carries at its upper end a valve member $4^a$, of a valve mechanism 4 which will be later described. The member $4^a$ is provided with a socket $4^{a\prime}$ which receives the upper end of the rod 3 and permits angular adjustment of the member $4^a$ thereon.

$2^d$ indicates an annular wall surrounding the rod 3. This wall is mounted on the base 2 and is preferably formed integral therewith. It serves as the shaft or axle for a rotary member 5 the hub $5^a$ of which rotatably fits the annular wall or shaft $2^d$. At the point of connection between the wall $2^d$ and base 2, a bearing shoulder $2^e$ is provided, and interposed between said shoulder and the adjacent or lower end of the hub $5^a$ are anti-friction bearings of a well known type on which the rotary member 5 is rotatably supported.

The rotary member 5 preferably comprises a carrier $5'$ having a plurality of arms $5^b$, which preferably extend radially, a series of brackets $5^c$, one of which is carried by each radial arm $5^b$, and an annular table or support $5^d$ supported concentrically of the axis of the rotary member 5 by the upper ends of the brackets $5^c$. The carrier $5'$ and hub $5^a$ may be formed integrally. The upper sides or faces of the arms $5^b$ are substantially flat and serve as bases to which the brackets $5^c$ are bolted in a well known manner. The arms $5^b$ may be provided with front and side walls $5^{b\prime}$, which strengthen them from end to end. The arms $5^b$ are uniformly spaced from each other around the axis of the rotary member 5 and thus provide supports for the table $5^d$ around its entire circumference.

$5^e$ indicates members depending from the arms $5^b$, to the lower flanged ends of which is secured a worm gear 7, by a screw or bolt $7'$ in a well known manner.

$7^a$ indicates a bracket, carried by the base 2 and provided with bearings for one end of a driving shaft $7^b$.

$7^c$ indicates a worm or screw secured to the shaft $7^b$ and meshing with the worm gear 7 to continuously drive the latter.

$7^d$ indicates an auxiliary support, adapted to be fixed to the floor $1^a$. This support is provided with suitable bearings to receive and support the opposite end of the shaft $7^b$.

$7^{d\prime}$ indicates a motor, of any suitable type, which, through suitable gearing indicated as a whole at $7^e$, transmits motion to the shaft $7^b$. As will be clearly understood from the drawings, the gearing $7^e$ and the worm 7 and the worm screw $7^c$ serve as reduction gearing, whereby the speed of the rotary member 5, as compared with that of the motor $7^{d\prime}$, is relatively slow.

The brackets $5^c$ are preferably arranged to incline or extend outwardly so as to provide supports for a table $5^d$ of relatively large size, their free ends being horizontal in order to support the table in a horizontal plane. The table or annular support $5^d$ preferably comprises a series of arc sections $5^{d\prime}$ arranged end to end and each flanged along its opposite side edges to strengthen it. The sections of the table $5^d$ are preferably bolted to the brackets $5^c$ in a well known manner.

$5^f$ indicates a plurality of openings formed in the table $5^d$ adapted to receive a series of independent or separate holding vessels 8. The openings $5^f$ are preferably uniformly spaced from each other and disposed midway between the brackets $5^c$.

The valve mechanism 4 includes a valve 10 which coöperates with the valve member $4^a$ to control the flow of the liquid to and from the vessels 8. The valve member $4^a$ preferably comprises a circular, a plate $4^{a\prime}$ provided with depending rim or wall $4^x$, which may be of conical shape. At one side and between the plate $4^{a\prime}$ and rim $4^x$, the walls of the valve member $4^a$ are thickened and formed with two ducts $4^b, 4^c$. The duct $4^b$ serves as the conduit for the liquid as it flows to the vessels 8, its inner end opening upwardly centrally of the valve member $4^a$ and its opposite or outer end leading through the rim $4^x$. The duct $4^c$, conducts the liquid through the valve member when a vessel 8 is emptying, its receiving end or port leading through the rim $4^x$, and preferably adjacent to the port of the duct $4^b$, and its opposite or discharge port opening downwardly as shown in the drawings. The valve seat element 10 preferably comprises a ring member formed with a series of openings $10^a$, corresponding in number to the number of holders or vessels 8 and each adapted to register successively with the ports of the ducts $4^b$, $4^c$, in the member $4^a$ as said ring member rotates thereon. The inner wall of the ring member is shaped to snugly fit the outer conical wall of the member $4^a$ to prevent leakage of the liquid.

$10^b$ indicates a series of pipe sections, preferably formed integral with the ring member and extending radially therefrom, there being a pipe section for each opening $10^a$. The function of the pipe sections will be later described.

The vessels 8 may each comprise inner and outer walls to form a space between them. This space may be filled with cork, as shown at $8^a$, or some other non-conductor of heat to provide a suitable insulating jacket. Each of said vessels is preferably provided with a detachable cover $8^b$, and a duct $8^c$ in its bottom, a suitable pipe section $8^d$ being provided for said duct and adapted for conveying the liquid to and from the vessel as will be later described.

8ᵉ indicates a flanged ring secured to the outer wall of each vessel 8. As will be understood from the drawings, when a vessel 8 is inserted in an opening 5ᶠ, the flange of the ring 8ᵉ will engage with the upper surface of the table 5ᵈ and serve to maintain the vessel 8 thereon. This construction serves to support the vessels in upright position and to permit their removal at will for cleaning or other purposes.

9 indicates a receiving chamber preferably arranged substantially axially of the holders 8 and slightly elevated relative thereto to permit the flow of the liquid by gravity to the holders. The chamber 9 is provided with a suitable cover through which extends the discharge end of a pipe $a^{10}$, which conducts the liquid in a substantially continuous and uniform manner from the liquid trough or discharge duct of the heater A to the chamber 9 of the distributing and holding apparatus D. The chamber 9 is preferably formed in two parts, an outer member 9ª, and an inner member 9ᵇ, between which is provided a suitable insulating jacket 9ᶜ. The jacket 9ᶜ serves to maintain the liquid in its heated condition. The chamber 9 is provided with an outlet pipe section 9ᵈ, which is detachably connected to the upper end of a conduit 9ᵉ, by a coupling 9ᵈ'. The lower end of the conduit 9ᵉ is detachably connected in a well known manner to a coupling 9ᶠ which in turn is screw threaded in the inner end or opening for the duct 4ᵇ. The pipe or conduit 9ᵉ and its connections with the chamber 9 and valve member 4ª serve as suitable means for rigidly supporting the chamber 9 upon the base 2 and at a suitable height to effect the flow of the liquid through the apparatus.

11 indicates a depending discharge pipe connected with the discharge end of the duct 4ᶜ. At its lower end, the discharge pipe 11 is connected with a delivery pipe 6 which conducts the liquid to a receiver 12, the flow of liquid through the pipe 6 and 11 from the holders being variable. A cut off cock or valve 6ª may be provided for the pipe 6.

12ª indicates a discharge pipe leading from the receiver 12ª and arranged to convey the liquid in a substantially continuous and uniform manner to the receiving tank $b^5$ for the preliminary cooler B. A valve 12' may be provided for controlling the flow of liquid from the receiver 12 to the tank $b^5$. The receiver 12 is preferably mounted on a standard 12ᵇ. It may be dispensed with if desired, in which event the liquid will be conducted directly to the tank $b^5$. The tank $b^5$ permits the liquid, after treatment in the holding apparatus D, to be inspected.

10ᶜ indicates a pipe, leading from the outer end of each pipe section 10ᵇ to the adjacent vessel 8. As shown in the drawings, the outer end of the pipe 10ᶜ leads to and is connected with the pipe section 8ᵈ of the vessel 8 by a T-member 10ᵈ and coupling 10ᵉ. The opposite or inner end of the pipe 10ᶜ is connected to the outer end of the pipe section 10ᵇ by a coupling 10ᶠ in a well known manner. The pipes 10ᶜ and their unions with the vessels 8 and pipe sections 10ᵇ serve as rigid connections between the valve 10 and vessels 8, whereby the revolving movement of the latter is transmitted to the valve element 10 in order that the latter will move with the vessels as a unit.

From the foregoing description it will be understood that the ring member 10 and walls of the member 4ª constitute a valve mechanism which controls the flow of the liquid through the pipes 10ᵇ, 10ᶜ, to and from the vessels 8 as each opening 10ª successively registers with the openings of the ports 4ᵇ, 4ᶜ.

During the time that the valve port 10ª for an adjacent vessel 8 registers with the duct 4ᵇ, as the vessel revolves, liquid will flow therethrough from the chamber 9 to the vessel to fill the same, the speed of the rotary member 5 and the size of the valve openings 4ᵇ being proportioned so that during the registry thereof sufficient liquid will flow through the valve to substantially fill the vessel.

The liquid is held in the vessel 8 during its revolving movement until its valve opening 10ª registers with the port of the discharge duct 4ᶜ, whereupon the liquid will flow by gravity from the vessel through the valve opening 10ª and duct 4ᶜ to the discharge pipe 11. As the ducts 4ᵇ, 4ᶜ, and the valve ports thereof are of substantially the same size, and the rotary member 5 rotates uniformly, it will be understood that substantially the same quantity of liquid will flow out of each vessel as flowed into it in the same time interval.

The valve port for the duct 4ᶜ, is preferably arranged in the rim 4ˣ immediately behind the valve port for the duct 4ᵇ, so that the filling operation for each vessel will follow immediately after it has been emptied. This arrangement also provides for the operation of filling and emptying adjacent vessels simultaneously.

As the vessels 8 are arranged in a circular series and revolve around the valve member 4ª, provision is made for bringing a vessel into filling position immediately after the preceding vessel has been filled and moved out of that position in order that the filling operation may be progressive, likewise by providing a discharge duct with which the valve ports for the vessels register successively provision is made for emptying the vessels in a progressive manner. While the effect of this construction and operation is to produce a more or less variable and intermittent flow of the liquid through the apparatus, the apparatus may be so proportioned to the apparatus to which it delivers as to give completely satisfactory results in connection therewith.

13 indicates a pipe or conduit leading from the pipe $a^{10}$ and connected at its outer end to a delivery pipe $6^b$. A valve, preferably of the three-way type may be interposed at the connection of the pipe 13 with the pipe $10^a$ to control the flow of the liquid to either the distributing and holding apparatus or direct to the cooler B, or to cut off the flow of the liquid entirely. The pipes 13 and $6^b$ may be used to conduct the liquid from the heater A to the cooler B, when it is unnecessary to treat the liquid in the distributing and holding apparatus D. The pipes $6^b$ and 13 may be formed in sections and connected together by couplings $13^a$ in a well known manner.

It will be understood that, in the system of pasteurizing liquid to which my invention is particularly applicable and in which the liquid is maintained at a pasteurizing temperature for a predetermined period, it is desirable to quickly and uniformly heat the liquid to the predetermined temperature, maintain the liquid at that temperature for a certain definite length of time in order to destroy or render innocuous any germs or bacteria contained in the liquid, and finally to cool the liquid to a normal temperature; and that it is also desirable that these steps shall be carried out in a progressive manner, that is, that there shall be a substantially continuous flow of the liquid to and through the heater, and from the heater to the holder. The holder, however, may deliver or discharge the milk in a more or less variable and intermittent manner. These results are all accomplished in the apparatus herein described and illustrated, as will be more fully understood from the following described operations: The liquid is delivered to a receiving tank having a discharge pipe A′, which operates as a supply means and from which it flows by gravity to the heater A. In passing through the heater the liquid is suddenly and uniformly raised to the desired temperature and is discharged from the heater by means of the pipe $10^a$, which conveys the liquid to the receiving chamber 9. As the carrier 5 and vessels 8 carried thereby revolve, the valve openings $10^a$ in the ring valve 10 register successively with the duct $4^b$ of the valve member $4^a$ and permit a predetermined quantity of the liquid to flow by gravity to each of the vessels, each valve port registering with the duct for a given period of time, in the rotary movement of the carrier, sufficient to, at least, substantially fill the adjacent vessel. Likewise, the valve openings $10^a$ of the valve ring 10 register successively with the discharge duct $4^c$ and permit the automatic discharge of the vessels successively. The valve duct $4^c$ of the valve mechanism 4 may be arranged at any predetermined point angularly of the axis of the carrier relative to the port $4^b$, so that the distance of travel of the vessels from the position for filling to the position for emptying may be of proper length in order that the period for holding the liquid may be fixed according to any particular circumstances desired. From this construction and operation it will be seen that the vessels will be automatically filled and emptied at predetermined points, and that the liquid in each vessel will be held therein for a predetermined period, the extent of which depends upon the length and time of travel from the place of filling to the place of discharge. It will be obvious that the speed of the carrier can be changed in various ways to increase or decrease the period between the filling and emptying of the vessels.

I am aware of the fact that it has been heretofore proposed to provide apparatus for treating or pasteurizing milk, cream or other liquids in which the milk was heated to a pasteurizing temperature while flowing continuously, was then maintained at the pasteurizing temperature for a sufficient period of time to destroy or render innocuous the bacteria without cooking the albumen in the milk, and without the discontinuing of the flow of the milk while being heated, and then cooling the milk, as for example as disclosed in Letters Patent of the United States No. 684,319, to Frederick G. Short, and I do not lay any claim broadly to a process of treating milk or other liquids and to apparatus such as set forth and disclosed in the said Short patent. On the contrary, I have sought to provide improved apparatus for the treating of milk or other liquids by first heating it to a pasteurizing temperature, then holding it at that temperature for a predetermined time, and then cooling it.

It will be noted that all walls of the conduits and receptacles in the holding mechanism, with which any liquid to be treated may come into contact, are readily accessible for the purpose of cleaning merely by disassembling adjacent parts or conduits. The importance of this in the sanitary handling of milk, for example, is well known. Further, it will be noted that the construction of the valve mechanism is such that liquid from the source of supply always flows in one direction through the valve inlet duct to the vessel ducts, successively, and also always flows in one direction through the valve discharge duct from the vessel ducts, successively. This enables me to establish a definite and permanent relation between the source of supply and the inlet duct through the valve mechanism and a definite and permanent relation between the outlet duct through the valve mechanism and the discharge way.

To those skilled in the art of making apparatus of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. The combination of a base, having a vertical axial rod mounted thereon, a valve mechanism, having valve openings, supported by said rod, a liquid receiving chamber, a conduit between said chamber and the valve mechanism, a member rotatably mounted on said base, a series of vessels for holding liquid carried by said member, connections between each of said vessels and the valve openings of the valve mechanism through which the liquid flows to and from the vessel, and means for rotating the rotary member.

2. The combination of a base, having a vertical axial rod mounted thereon, a valve mechanism, including inlet and outlet ducts, supported by said rod, a receiving chamber, a conduit between said chamber and the inlet duct of the valve mechanism, a member rotatably mounted on said base, a series of vessels for holding liquid carried by said member, connections between each of said vessels and the ducts of the valve mechanism through which the liquid flows to and from the vessel, a discharge conduit connected with the outlet duct, and means for rotating the rotary member.

3. The combination with a base, of a liquid receiving chamber, a valve member formed with inlet and outlet ducts, a conduit between the chamber and the inlet duct of the valve member, a valve rotatably fitting the valve member, the said valve being formed with a series of openings each adapted to successively register with the ports of the ducts in said valve member as the valve is rotated, a member rotatably mounted on said base, a series of vessels for holding liquid carried by the rotatable member, liquid tight connections between each of said vessels and an opening in the valve through which the liquid flows to and from the vessel, means connected with the outlet duct for discharging the liquid from the vessels, and means for rotating the rotary member.

4. The combination with a base, of a liquid receiving chamber, a valve member formed with an inlet duct, a conduit between the chamber and the inlet duct of the valve member, a valve rotatably fitting the valve member, the said valve being formed with a series of openings each adapted to successively register with the port of the duct in said valve member as the valve is rotated, an annular support rotatably mounted on said base, a series of separate vessels for holding liquid carried by the rotatable support, connections between each of said vessels and an opening in the valve through which the liquid flows to the vessel, means for discharging said vessels, and means for rotating the support.

5. The combination with a base, of a receiving chamber, a valve member provided with a rim and formed with inlet and outlet ducts, the ports of which lead through the rim, a conduit between the chamber and the inlet duct of the valve member, a valve rotatably fitting the rim of the valve member, the said valve being formed with a series of openings adapted to successively register with the ports of the ducts in said valve member when the valve is rotated, a member rotatably mounted on said base, a series of vessels for holding liquid carried by the rotatable member, connections between each of said vessels and an opening in the valve through which the liquid flows to and from the vessel, and means for rotating the rotary member, the said connections between the vessels and the valve operating to move the latter with the vessels.

6. The combination with a base, of a liquid receiving chamber, a valve member formed with inlet and outlet ducts, a conduit between the chamber and the inlet duct of the valve member, a member rotatably mounted on said base, a series of vessels for holding liquid carried by the rotatable member, and means for successively filling and emptying said vessels, the said means comprising a valve rotatably fitting said valve member and formed with a series of openings, one for each vessel, arranged to register with the ports of the ducts as the valve rotates, liquid tight connections between each of said vessels and one of the openings through which the liquid flows to and from said vessel, and means for rotating the rotary member.

7. The combination with a base having a vertically extending rod, of a valve mechanism including a valve and a valve member provided with a socket fitting the upper end of said rod and supported thereby, the said valve member being formed with inlet and outlet ducts and the valve being formed with a series of ports surrounding and rotatably fitting the said valve member, the said ports being arranged to register with the ducts successively during the rotation of said valve, a rotatable member mounted on said base and carrying a series of vessels for holding liquid arranged concentrically to said valve mechanism, a liquid receiving chamber connected with the inlet duct of the valve member, a conduit between each of said vessels and a port in said valve through which liquid flows, and means for rotating the rotatable member.

8. The combination with a base having a vertically extending rod, of a valve mechanism including a valve and a valve member provided with a socket fitting the upper end of said rod and supported thereby, the said valve member being formed with inlet and outlet ducts, and the valve being formed with a series of ports and surrounding and rotatably fitting the said valve member, the said ports being arranged to register with the ducts successively during the rotation of said valve, a rotatable member mounted on said base and carrying a series of vessels for holding liquid arranged concentrically to said valve mechanism, a liquid receiving chamber, a vertically extending conduit mounted on the valve member and serving to support the liquid receiving chamber above the vessels, the conduit being connected at its opposite ends with said chamber and the inlet duct, a liquid tight connection between each of said vessels and a port in said valve through which liquid flows to and from the vessel, and means for rotating the rotatable member.

9. The combination with a base, of a stationary receiving chamber, a carrier rotatably mounted on said base, a series of vessels carried by the carrier and arranged concentrically to said receiving chamber, a filling and discharge valve mechanism between said chamber and said vessels operating automatically to successively fill and empty them, the said valve mechanism comprising a stationary member mounted on the base and a rotary member, a conduit between the receiving chamber and the stationary member of the valve mechanism, and means for continuously rotating said carrier.

10. The combination with a base, of a stationary receiving chamber, a carrier rotatably mounted on said base, a series of vessels carried by the carrier and arranged concentrically to said receiving chamber, a filling and discharge valve mechanism between said chamber and said vessels operating automatically to successively fill and empty them, the said valve mechanism comprising a stationary member mounted on the base and a rotary member, a conduit between said receiving chamber and the stationary member of the valve mechanism serving to support the chamber above said vessels, the valve mechanism being arranged below said vessels and permitting them to empty by gravity, and means for continuously rotating said carrier.

11. The combination with a base, of a stationary receiving chamber, an annular support rotatably mounted on said base, a series of vessels carried by the support and arranged in a plane below the receiving chamber, a filling and discharge rotary valve mechanism between said chamber and said vessels and arranged in a plane below the latter, the said valve mechanism having a rotary liquid control valve, connections between each of said vessels and said valve whereby the latter operates automatically to successively fill and empty said vessels, and means for continuously rotating said support.

12. The combination with a base, a carrier rotatably mounted on said base, a circular series of vessels carried by the carrier, a valve member arranged axially of said carrier and formed with an inlet duct and an outlet duct, means for supplying liquid to said inlet duct, a valve rotatably fitting said valve member and formed with a series of openings each arranged to register successively with the ports of the inlet and outlet ducts, a liquid tight connection between each of said vessels and an opening in said valve through which the liquid flows to and from the same, a discharge conduit connected with the outlet duct of the valve member, and means for rotating said carrier.

13. The combination of a base provided with an annular wall, a carrier provided with a hub rotatable on said wall, an annular table or support, formed with a series of openings, mounted on said carrier, a series of vessels for holding liquid removably mounted in the openings, a valve mechanism arranged axially of said table or support for controlling the flow of liquid to and from said vessels and operating to fill and empty them successively, the said valve mechanism including a valve ring and separate connections between it and each vessel movable bodily with the latter, and means for rotating said carrier.

14. The combination of a base provided with an annular wall, a carrier provided with a hub rotatable on said wall, an annular table or support, formed with a series of openings, mounted on said carrier, a series of vessels for holding liquid removably mounted in the openings, a valve mechanism arranged axially of said table or support for controlling the flow of liquid to and from said vessels and operating to fill and empty them successively, the said valve mechanism including a valve ring and separate connections between it and each vessel movable bodily with the latter, a liquid supply chamber, the said chamber and valve mechanism being arranged above and below said vessels, respectively, to permit the filling and emptying thereof by gravity, and means for rotating said carrier.

15. The combination of a base, provided with an annular wall, a carrier provided with a hub rotatable on said wall, an annular table or support mounted on said carrier and comprising a series of arc sections placed end to end, each of said sections being formed with an opening, a series of vessels for holding liquid mounted in the openings, a valve mechanism for controlling the flow of liquid to and from said vessels and operating to fill and empty them successively, and means for rotating said carrier.

16. The combination of a base, provided with an annular wall, a carrier having a hub rotatable on said wall and provided with a series of arms, a bracket fixed to each of said arms, an annular table or support formed with a series of openings mounted on the upper ends of said brackets, a series of vessels for holding liquid removably mounted in the openings, a valve mechanism for controlling the flow of liquid to and from said vessels and operating to fill and empty them successively, and means for rotating said carrier.

17. The combination with a support, of an annular member rotatably mounted thereon, a series of separate liquid holding vessels carried by said member, a liquid supply chamber, a combined filling and discharge valve mechanism common to said vessels, connections between each of said vessels and the said valve mechanism, and means for rotating said annular member, whereby said valve mechanism operates to successively fill and empty said vessels.

18. The combination with a support, of an annular member rotatably mounted thereon, means for rotating said member, a series of separate liquid holding vessels carried by said member, a liquid supply chamber, a combined filling and discharge valve mechanism common to said vessels, the said valve mechanism including a rotary member arranged to be controlled by the movement of said annular member, and liquid tight connections between each of said vessels and the said valve mechanism, said valve mechanism operating successively to fill and empty said vessels.

19. The combination with a support, of an annular member rotatably mounted thereon, means for rotating said member, a series of separate liquid holding vessels carried by said member and each formed with an opening in its bottom wall, a liquid supply chamber, a combined filling and emptying valve mechanism common to said vessels and arranged to successively fill the vessels and to successively empty them, the said mechanism including a rotary member arranged to be controlled by the movement of the annular member, and the said liquid supply chamber and the valve mechanism being arranged in planes above and below the said vessels, respectively, liquid-tight connections between the opening in the bottom of each vessel and said valve mechanism through which the liquid flows to and from the adjacent vessel, and a conduit for the liquid discharged from the vessels.

20. In apparatus of the character described, the combination of a valve mechanism comprising a stationary member and a rotary member, the stationary member being formed with two ducts each having an inlet and a discharge port and the rotary member being formed with a plurality of ports each arranged to register successively with the discharge port of one of said ducts in said stationary member, a series of vessels movable in unison with said rotary member, and a duct leading from each of said ports in said rotary member to one of said vessels to conduct liquid to and from the latter.

21. In apparatus of the character described, the combination of a valve mechanism comprising a stationary member and a rotary member, the stationary member being formed with two ducts each having an inlet and a discharge port and the rotary member being formed with a plurality of ports each arranged to register successively with the discharge port of one of said ducts in said stationary member and the inlet port of the other of said ducts in said stationary member, a series of vessels movable in unison with said rotary member, a duct leading from each of said ports in said rotary member to one of said vessels to conduct liquid to and from the latter, and a stationary liquid supply duct leading to the inlet port of one of said ducts in said stationary member.

22. In apparatus of the character described, the combination of a valve mechanism comprising a stationary member and a rotary member, the stationary member being formed with two ducts each having an inlet and a discharge port and the rotary member being formed with a plurality of ports each arranged to register successively with the discharge port of one of said ducts in said stationary member and the inlet port of the other of said ducts in said stationary member, a series of vessels movable in unison with said rotary member, a duct leading from each of said ports in said rotary member to one of said vessels to conduct liquid to and from the latter, and a stationary liquid discharge duct leading from the discharge port of one of said ducts in said stationary member.

23. In apparatus of the character described, the combination of a valve mechanism comprising a stationary member and a rotary member, the stationary member being formed with two ducts each having an inlet and a discharge port and the rotary member being formed with a plurality of ports each arranged to register successively with the discharge port of one of said ducts in said stationary member, a series of vessels movable in unison with said rotary member, a duct leading from each of said ports in said rotatable member to one of said vessels to conduct liquid to and from the latter, a stationary liquid supply duct leading to the inlet port of one of said ducts in said stationary member, and a discharge duct leading from the discharge port of the other duct in said stationary member.

24. In apparatus of the character described, the combination of a valve mechanism comprising two members one of which rotates relative to the other member, one of said members being formed with two ducts each having an inlet and a discharge port and the other member being formed with a plurality of ports each arranged to register successively with the discharge port of one of said ducts in first mentioned member and the inlet port of the other of said ducts in said member, a series of vessels and a duct leading from each of said ports in the last mentioned member to one of said vessels to conduct liquid to and from the latter.

In testimony whereof I affix my signature, in the presence of two witnesses.

LEROY S. PFOUTS.

Witnesses:
 JOHN H. BISHOP,
 W. H. MILLER.